UNITED STATES PATENT OFFICE.

CHARLES A. CATLIN, OF PROVIDENCE, RHODE ISLAND, ASSIGNOR TO THE RUMFORD CHEMICAL WORKS, OF SAME PLACE.

BAKING-POWDER.

SPECIFICATION forming part of Letters Patent No. 474,811, dated May 17, 1892.

Application filed October 12, 1891. Serial No. 408,502. (No specimens.)

*To all whom it may concern:*

Be it known that I, CHARLES A. CATLIN, a resident of Providence, in the State of Rhode Island, have invented a new and useful Improvement in Baking Preparations, which improvement is fully set forth in the following specification.

My invention relates to that class of baking preparations in which the active acid agent is, either in whole or in part, some form of phosphoric acid or acid phosphate.

Under the general head of baking preparations may be included, first, the ordinary baking-powder, composed of a mixture of the phosphoric-acid element with a carbonate or bicarbonate as active agents; second, the phosphoric-acid element when put up alone, as is sometimes done, without the carbonate or bicarbonate; third, preparations in which the phosphoric-acid element and carbonate or its equivalent are put up in separate packages to be mixed before use, and, fourth, preparations known as "self-raising flour," "quick-rising flour," "prepared flour," and by various other names, in which the phosphoric-acid element and carbonate are mixed by the manufacturer with flour in proper proportions for use in making bread.

Broadly stated, the present invention consists in the production of a baking preparation in which the phosphoric-acid element is in a practically uniform granular condition, free from pulverulent phosphatic material. This granular phosphoric-acid material constitutes a new product or article of manufacture, possessing peculiar and distinctive properties and characteristics of great value for the purposes stated, as will be hereinafter explained.

As is well known to those familiar with such matters, preparations of the kind above referred to, as ordinarily prepared, while possessing the highest dietetic value and leavening efficiency, possess, nevertheless, the property of serious deterioration when freely exposed to atmospheric humidity, compelling the manufacturer to employ extraordinary and expensive means in packing to protect them from this influence.

Heretofore it has been the aim of the manufacturer to produce the phosphatic element in the finest pulverulent condition possible, believing that thus, and thus only, could highest efficiency be obtained. I have discovered, however, that the fine pulverulent condition of the commercial phosphatic powders is not necessary to highest efficiency in the leavening quality, but is rather detrimental to it. Indeed, the results of my experiments have demonstrated that when a baking-powder having the phosphatic element in a granular condition is used in place of one containing that element mainly in a fine pulverulent form the leavening efficiency of the preparation is materially augmented, while at the same time the deterioration quality is retarded, if not entirely overcome. The reason for the increased efficiency will be readily understood when we take into consideration the fact that within limits a somewhat slow evolution of the leavening carbonic-acid gas is desirable, in order that too much of it may not escape from the dough during the mixture and kneading before the leaf is placed in the oven; but rather that a considerable part of it shall remain to be evolved during the baking process, that the dough may be at its highest expansion when hardened by the baking into the permanent cellular structure of the finished loaf. The slow-evolution quality is not possessed in a marked degree by phosphatic baking-powders as heretofore prepared, and especially is it lacking when the phosphatic element employed is of a highly-acidulous character. This is due to the ready solubility of the acid agent in its finely-powdered condition, which of course brings it into rapid reaction with the alkaline bicarbonate and causes the rapid evolution of its gas. When, on the contrary, the particles of the acid are in a coarse condition, solution and consequent reaction are retarded. In practice I have found, therefore, that by giving to the phosphatic element of the baking-powder a uniformly-coarse condition the property of slow evolution of the gas is increased and a consequent marked increase in baking efficiency is obtained. In this respect, therefore, the new product possesses a distinct advantage over phosphatic powders heretofore made and used.

As is well known, acid phosphates possess naturally a highly-deliquescent property, and this to such a degree when reduced to a finely-powdered state and exposed to variable atmospheric conditions that they at times greedily absorb moisture, and thereby acquire of themselves alone (or impart to any mixture of powders of which they form a considerable proportion) a sticky, clammy condition. This absorption of moisture by the acid element when packed separately in the usual fine condition causes a recrystallization of the powder, which in such case hardens into a caky crystalline mass, unsuitable for the use intended. Moreover, such a powder or mixture of powders is difficult to pour either in or out of any small-necked receptacle, and is especially difficult to measure out in the quantities in which baking-powders are used. This objectionable quality in phosphatic powders, I have found, does not attach to any serious extent to the new granular preparation. The reason for this improvement is plainly apparent when we take into consideration the fact that in the same weight of material the surface exposed to the atmospheric influence is greatly increased the finer its pulverulent condition.

I have furthermore discovered that in phosphatic baking-powders as heretofore prepared the deteriorating quality is largely due to the exceedingly fine pulverulent condition of the acidulated element, and I have demonstrated that this is true by comparing a baking-powder having its phosphatic element in granular form essentially free from all finely-pulverulent phosphatic material with other like baking-powders having the phosphatic element in the usual powdery condition, with the result that the latter was practically spoiled, while the former showed little or no deterioration.

The improved keeping quality of baking-powder mixtures containing the acid phosphates in a uniformly-granular condition is due partly to the reduced deliquescent property of the acidulated material in such condition, already referred to, and partly to the greatly-reduced number of points of contact which such granular acidulated material presents to the carbonate, with which it is in admixture, in proportion to the weight employed. Another reason for this improved result is the increased size of the interspaces between the active particles, due to this granular condition, which permits, when a fine diluent is employed, of a more complete introduction of said diluent between these particles and their isolation from each other.

To prepare the acidulated phosphate in this improved granular condition, I proceed as follows: I take the material as ordinarily prepared for the grinding process and, passing it through any suitable mill, grind it to a rather coarse condition and then bolt it through as coarse a bolt as I find its proper baking efficiency will allow. For most preparations of this kind I have found a No. 9 silk bolt to answer the requirement. This bolted product from the No. 9 silk I now subject to another bolting process, using a much finer bolt for this purpose. A No. 16 silk has given me excellent results for this. The material should be continued long enough in this No. 16 silk to completely remove all of the fine material that will pass through it. The process may be much facilitated by using knockers or aspirators, if the condition of the material requires. The material refusing to pass the No. 16 bolt is a mass composed entirely of granules practically uniform in size, and this may be put up for use and sale in any of the ways above indicated. The material passing through the No. 16, if no other use be found for it, may be used as a drier in the crystallization of new batches of the phosphatic material and no loss be incurred from this source except the double handling involved.

It is evident that any other suitable method of producing the phosphatic material in granular form may be employed, and the resulting product possesses equally valuable qualities, and therefore I do not restrict myself to the method described nor to the particular size of granules set forth.

What I claim as my invention, and desire to secure by Letters Patent, is—

1. A baking preparation containing phosphoric acid or its compounds in granular condition essentially free from pulverulent phosphatic material, substantially as described.

2. A baking preparation composed of a phosphoric-acid element in granular form essentially free from pulverulent phosphatic material, in admixture with a carbonate or bicarbonate, as set forth.

In testimony whereof I have signed this specification in the presence of two subscribing witnesses.

CHAS. A. CATLIN.

Witnesses:
JAMES V. SCHROEDER,
CHAS. HALLEY.